P. SCHWOERER.
APPARATUS FOR TREATING OLEIC ACID.
APPLICATION FILED DEC. 26, 1907.
902,177.
Patented Oct. 27, 1908.
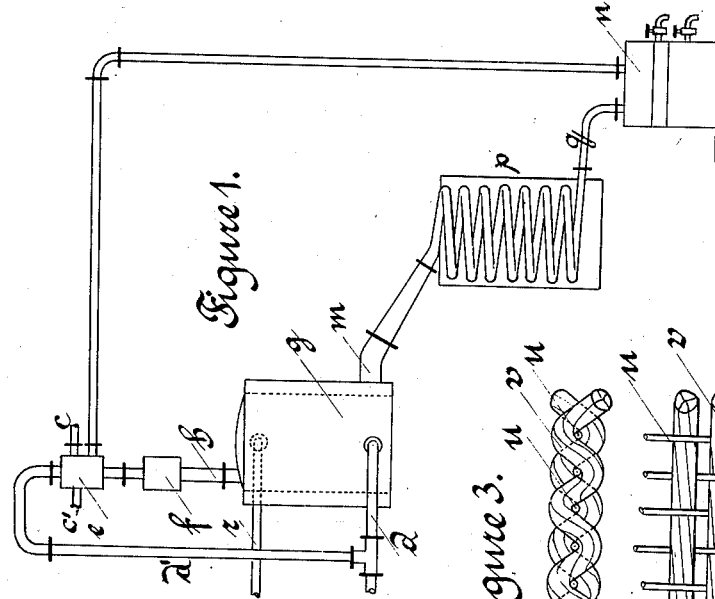
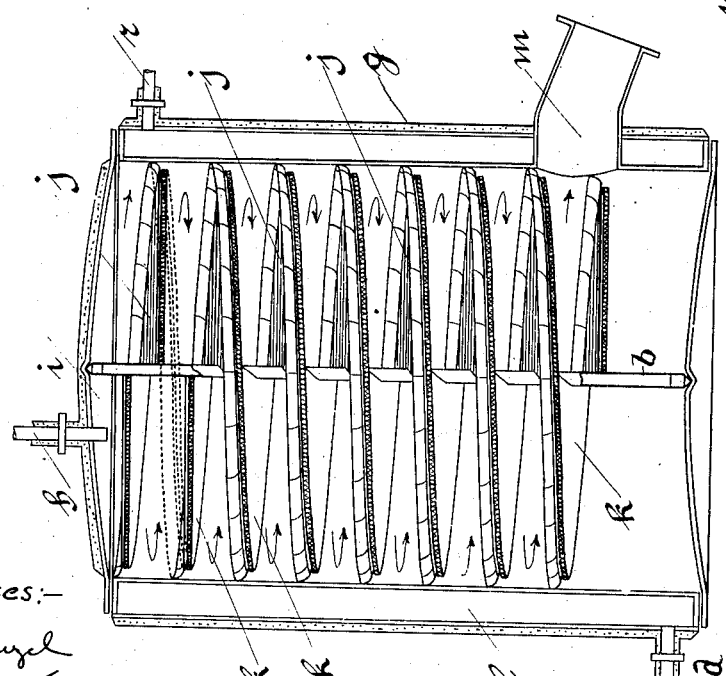
Witnesses:—
Paul Kinzel
Georg Otto
Inventor:— Philipp Schwoerer
by Paul E. Schilling, attorney

UNITED STATES PATENT OFFICE.

PHILIPP SCHWOERER, OF STRASSBURG, GERMANY.

APPARATUS FOR TREATING OLEIC ACID.

No. 902,177. Specification of Letters Patent. Patented Oct. 27, 1908.

Application filed December 26, 1907. Serial No. 408,125.

*To all whom it may concern:*

Be it known that I, PHILIPP SCHWOERER, a subject of the German Emperor, and residing at Strassburg, Germany, have invented certain new and useful Improvements in Apparatus for Treating Oleic Acid, of which the following is a specification.

The present invention relates to an improved construction of apparatus or device for carrying out the well-known process for transforming oleic acid into stearic acid under the action of hydrogen and in the presence of a finely distributed metal, for instance, nickel, as catalytic agent.

As described by Sabatier and Senderens in their treatise on the catalytic action of finely distributed nickel, (*Annales de Chimie et de Physique*, 1905, page 323), the output of the product rises with the temperature. The latter, however, is limited in the treatment of oleic acid in vapor state, since at a temperature of about 270 centigrade the decomposition of the fatty acids commences and the generated heavy volatile products of decomposition destroy the activity of the contact-material. Moreover, the product thus obtained could not be used directly in the manufacture of candles.

It has been found that by carrying out the above described reaction in the evaporator itself, the stated temperature will not be exceeded and can readily be controlled by the evaporating medium, thus doing away with the difficulty of keeping up the temperature in a separate reaction chamber, as well as with the special heating and care otherwise necessary.

In order to make my invention readily understood, I will now describe it with reference to the accompanying drawing, in which Figure 1 shows a diagrammatic view of my complete apparatus, Fig. 2 a vertical section through my improved apparatus, and Figs. 3 and 4 an edge and a plan view, respectively, of the catalytic mass.

The process is preferably carried out in a cylindrical receptacle or reaction chamber provided with a helical pan $i$ which extends perpendicularly from the top to near the bottom of the receptacle, and is supported upon a central post $b$.

The oleic acid, gradually heated to a temperature of from 250–270 C., runs, as is well-known in the art, down the helical pan and is drawn off below. The reaction chamber is surrounded by a jacket $l$ into which superheated steam is introduced at $d$, for the purpose of heating from without and thereby readily regulating the reaction and the evaporation temperature. The steam escapes at $r$. The helical pan $i$ upon whose upper surface $j$ the substances such as saponified oleic fats, containing oleic acid or the oleic acid, *per se*, continuously spread in a thin layer or film through the inlet $h$, is provided with an upturned outer rim, may or may not be directly connected to the inner wall of the reaction chamber.

According to my invention I apply to the underside of the helical pan $i$ the catalytic agent, preferably consisting of an asbestos body $k$, containing a copper or the like metal skeleton and suitably impregnated with nickel, as described for instance by Sabatier and Senderens. Opposite the lowermost turn of the worm there is provided the discharge pipe $m$.

The employment of the helical pan serves the purpose, unlike the other constructions of evaporating chambers, of effecting the continuous reaction of the oleic acid vapor with the hydrogen, without wetting the catalytic agent with liquid oleic acid, which would produce tar formation on it and thus disturb perfect reaction.

The arrangement of the catalytic mass $k$ is shown in Fig. 3. The skeleton is formed of wires $n, n$ of copper like the woof of a fabric. It serves as binder for the asbestos threads $v$ serving as warp, which according to Sabatier and Senderens are impregnated with the catalyte.

The operation of my improved device is as follows: The superheated steam combines with the hydrogen in chamber $e$ (Fig. 1) for instance by mixing in the hydrogen continuously. The fatty acids, entered through pipe $C^1$ or other suitable inlet and preferably pre-warmed, are then dissolved by means of an injector $f$ into small drops, and are then conducted through pipe $h$ into the catalytic apparatus $g$ together with the superheated steam and hydrogen. Or the fatty acids may be introduced into the upper part of the helical pan $i$ (Fig. 2) in any other suitable manner. They are then heated to a temperature of from 250–270 C. by the regulatable heat within the jacket chamber $l$, and run in a thin layer down the upper surface $j$ of the helical pan $i$. Hereby they are volatilized and enter into reaction with the catalytic agent in the presence of the mixture of superheated steam and hydrogen or other gas technically adaptable to catalysis, the catalytic substance, as explained above, being finely distributed over the underside of the helical pan $i$ and thus not in direct contact with the liquid oleic acid. The vapors issuing from pipe $m$ are condensed in vessel $p$ and run through pipe $q$ into the vessel $n$. The entrained hydrogen, can be recovered, and re-introduced into the chamber $e$.

This process which transmutes the oleic fatty acid in the vapor state into material for making candles, can be carried out with technical oleic acid, also with oleic fats after saponification, which may be obtained by the lime, magnesia, sulfuric acid, enzyme or other well-known processes.

What I claim is:—

1. In an apparatus for converting oleic acid into stearic acid according to the contact process, a reaction chamber, a helical pan therein, inlet and outlet means for said reaction chamber, and a catalytic agent on the underside of said pan, substantially as and for the purpose set forth.

2. In an apparatus of the type and for the purpose described, a reaction chamber, a stationary helical pan therein contacting with the wall of said chamber, inlet and outlet means for said chamber, a heating jacket about said chamber, inlet and outlet means for said jacket, and a catalytic agent finely distributed over the underside of said pan, substantially as set forth.

3. In an apparatus of the type and for the purposes described, in combination with the reaction chamber and a helical pan therein, a catalytic agent on the underside of said helical pan, substantially as set forth.

4. In an apparatus of the type and for the purposes described, in combination with the reaction chamber and a helical pan therein, a catalytic agent on the underside of said helical pan comprising a copper skeleton, an asbestos body held by said skeleton, and a nickel catalytic agent finely distributed through and over said asbestos body, substantially as set forth.

In testimony whereof I affix my signature in presence of two witnesses.

PHILIPP SCHWOERER.

Witnesses:
CARL W. SCHMITT,
CARL SCHWOERER.